United States Patent [19]

Stafford-Mills et al.

[11] Patent Number: 4,572,527
[45] Date of Patent: Feb. 25, 1986

[54] APPARATUS FOR AUTOMATICALLY LEVELLING A BASE

[76] Inventors: Jonathan V. Stafford-Mills, The Old Vicarage, Tidenham, Near Chepstow, Gwent; Nicholas R. Silcox, Severn House, East Horrington, Wells, Somerset, both of United Kingdom

[21] Appl. No.: 599,061

[22] Filed: Apr. 11, 1984

[30] Foreign Application Priority Data

Apr. 11, 1983 [GB] United Kingdom ............... 8309756

[51] Int. Cl.$^4$ .................... B60S 9/00; B62D 37/00
[52] U.S. Cl. ..................................... 280/6.1; 180/41; 254/418; 280/763.1
[58] Field of Search ............ 280/6 R, 6 H, 6.1, 763.1, 280/766.1; 180/41; 254/45, 418, 423, 424, 425

[56] References Cited

U.S. PATENT DOCUMENTS 3,269,685  8/1966  Wallace ................................ 280/6.1
3,630,317 12/1971  Jacobsson ......................... 280/766.1
3,669,409  6/1972  Eranosian ........................... 280/6.1
4,084,830  4/1978  Daniel, Jr. et al. .................. 280/6.1

FOREIGN PATENT DOCUMENTS 503931  4/1939  United Kingdom .
543584  3/1942  United Kingdom .

Primary Examiner—Joseph F. Peters, Jr.
Assistant Examiner—Kenneth R. Rice
Attorney, Agent, or Firm—Pearne, Gordon, Sessions, McCoy, Granger & Tilberry

[57] ABSTRACT

An apparatus for levelling a base comprises two switches (T, L) arranged to sense the disposition of a caravan or trailer base (10) in mutually perpendicular directions. According to the state of each of the switches, jacks disposed at each of the corners (11-14) of the base are actuated to alter the height of the respective corner. Further switches (SM1-SM4) are actuated when a corner of the base (10) is at a desired height to prevent further movement of the associated jack, and to cause movement of one or more other jack to level the base. Operation of the jacks in response to the switches is controlled by a control unit.

4 Claims, 9 Drawing Figures

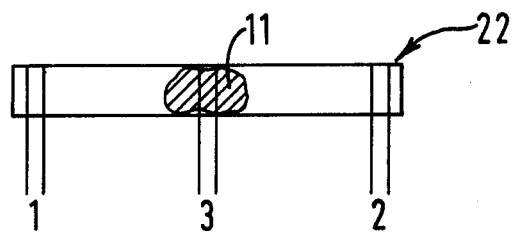
FIG. 5.
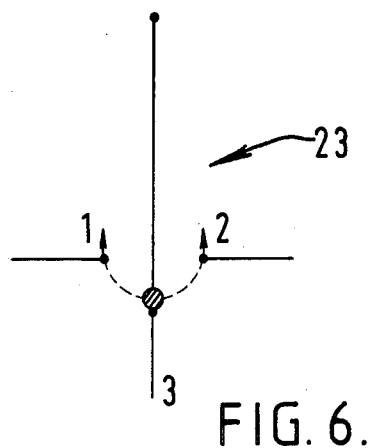
FIG. 6.
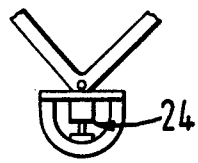 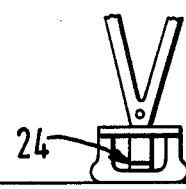
FIG. 7a.    FIG. 7b.

APPARATUS FOR AUTOMATICALLY LEVELLING A BASE

The present invention relates to apparatus for automatically levelling a base.

According to the present invention there is provided apparatus for automatically levelling a base, the apparatus comprising: a first switch for sensing misalignment in a first direction; a second switch for sensing misalignment in a second direction; levelling means, comprising a plurality of height altering means for adjusting the disposition of the base with respect to a surface on which the base is to be levelled, each of which altering means is provided with a further switch which is activated in response to a contact between the levelling means and the surface; and control means which are activated by the first, second and further switches to control the levelling means.

For a better understanding of the present invention, and to show how the same may be carried into effect, reference will now be made, by way of example, to the accompanying drawings, in which:

FIGS. 5 and 6 show examples of switches which may be used; and

FIGS. 7a and 7b show the operation of a type of pressure sensor which may be used to activate the foot switches.

Figure 2:
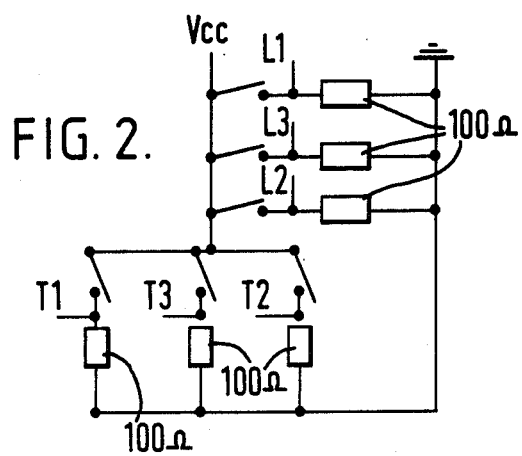
Figure 3:
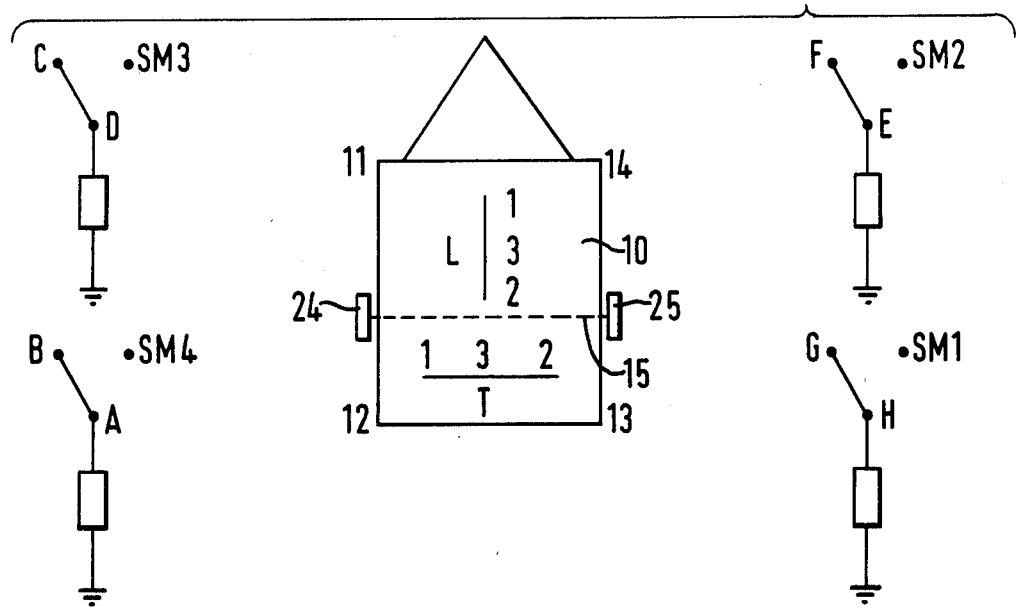
FIG. 3 shows a diagrammatic view of a caravan or trailer, with the switch mechanisms associated with each foot thereof.
Figure 3A:
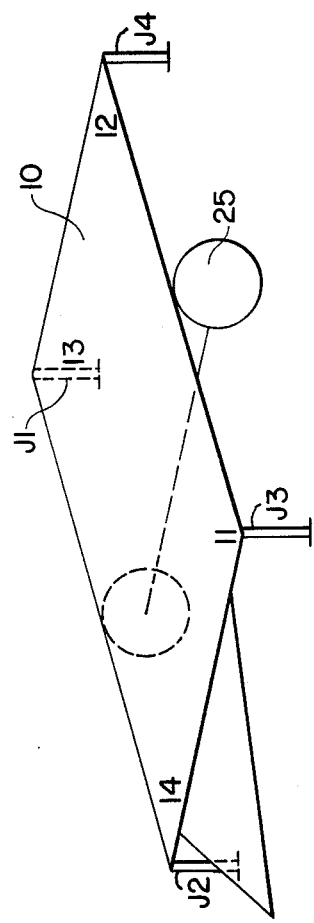
FIG. 3A shows a perspective view of a caravan or trailer as schematically illustrated in FIG. 3.

FIGS. 3 and 3A illustrate diagrammatically the base 10 of a caravan or trailer, provided with transverse and longitudinally arranged switches L, T arranged at right angles to each other. The switches may be, for example, mercury switches 22 as shown in FIG. 5, arranged in the horizontal plane, or pendulum switches 23 as shown in FIG. 6, arranged in the vertical plane. A photo-electric type switch may also be used. The function of the switches is to sense the attitude of the caravan or trailer to be levelled. For example, with corner 13 of the caravan or trailer base 10 being lower than corners 11, 12 and 14, the mercury globule 11 will move towards end 2 of switch 22 in both the T and L locations, thus activating switches T2 and L2 shown in FIG. 2.

The system causes jacks, J1, J2, J3 and J4 positioned at corners 13, 14, 11 and 12 respectively, to be lowered, there being separate manual means, not shown, for raising the jacks. Pressure sensors are also provided to indicate firm contact of the jacks with the ground. They could take the form of simple push switches 24 mounted one on each of the jacks as shown in FIGS. 7a and 7b. Each switch may be rubber encased in order to withstand operating pressures and also for weather protection.

Figure 4:
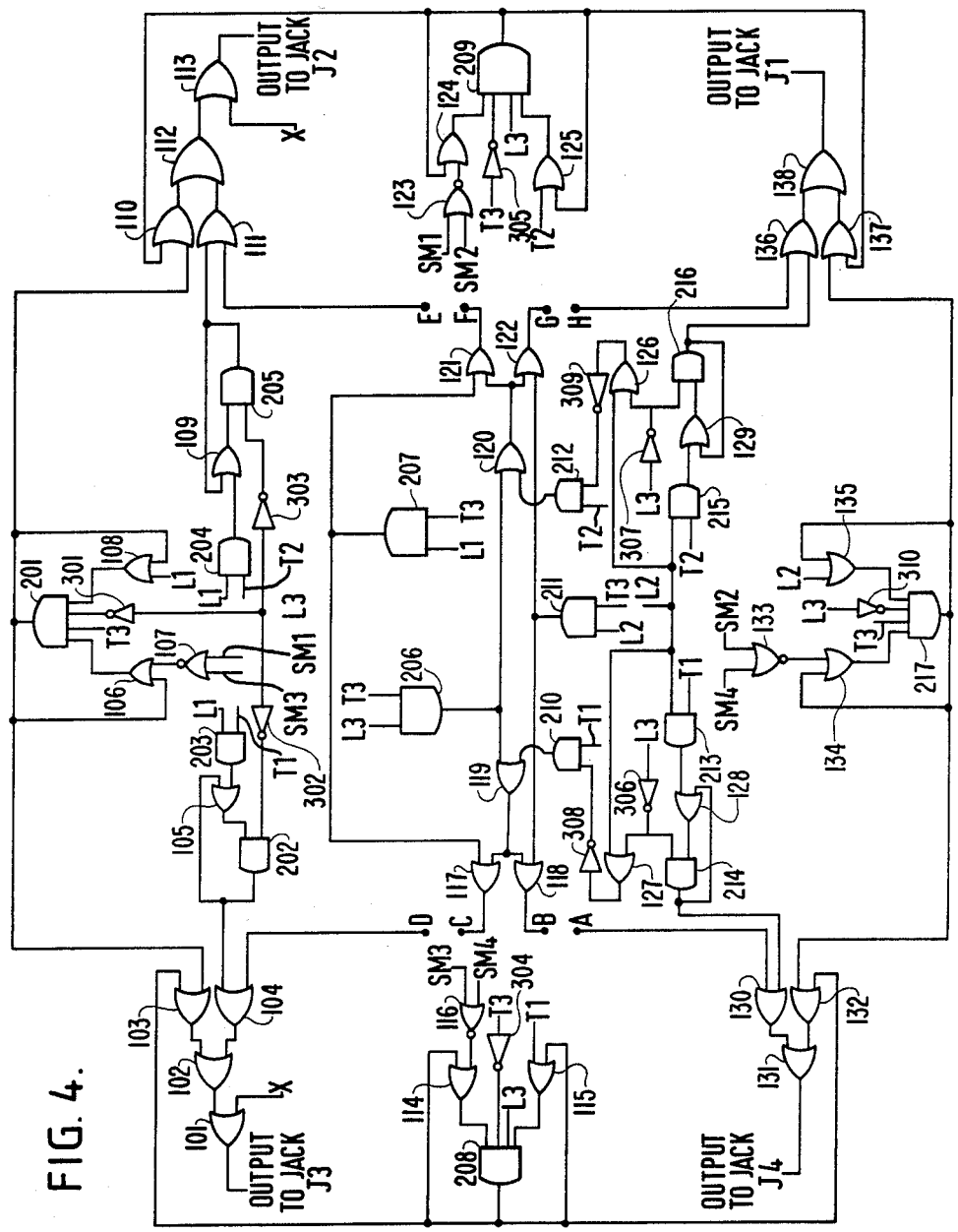
FIG. 4 shows an example of an electronic system which may be used in the levelling system.

When switches 24 are activated, they cause the respective terminals, labelled SM in FIGS. 3 and 4, to be connected to earth via a resistor.

Figure 1:
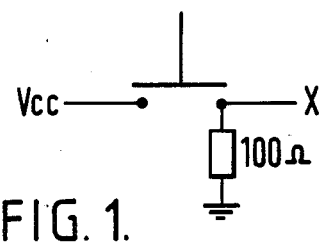
FIGS. 1 and 2 show switch connections which activate a levelling system.

The voltage level, Vcc in FIGS. 1 and 2, is chosen to suit the logic system being used. Typically, in a TTL system, Vcc=5V, and the resistors are of the order of 100Ω.

To illustrate the operation of the system, it will be assumed that initially corner 11 is the lowest corner with respect to the horizontal. In this state, that is with switches T1 and L1 activated (T1=H, L1=H), Jack J3 is activated as can be seen from state (f) in the table, Table 1. When J3 reaches the ground and S3 is activated (S3=L), state (j), J3 continues pivoting the caravan or trailer about the axle 15 in FIG. 3, until the caravan is longitudinally level, i.e. until switch L3 is activated. In this state, state (n), Jack J4 is activated and it lowers until the push switch 24 (S4) is activated which disconnects A from B in FIG. 3, connecting A to SM4. This state (r) causes jacks J3 and J4 to be lowered simultaneously, pivoting the caravan or trailer base 10 about wheel 25, until the caravan or trailer is transversely level. With the caravan or trailer transversely level, T3 is activated, and thus, according to the state (u), jacks J2 and J1 are lowered until they reach the ground.

The electronics ensure that the jacks continue to operate until the caravan or trailer is level and all four feet are in contact with the ground. The degree of contact required depends, among other things, on the type of rubber used for the pressure sensors shown in FIG. 7a and 7b.

A similar sequence is adopted depending on which corner is the lowest initially. Thus, the control circuit takes into account whether the caravan or trailer is initially level, level longitudinally, level transversely or none of these, before starting the appropriate levelling sequence.

In the case of a trailer, it would be advantageous to raise the front independently of the automatic levelling function in order to uncouple a towing hitch. This facility is incorporated into the main electronics by means of a switch shown in FIGS. 1 and 4.

The four logic outputs enable power to be switched to the lifting jacks. This may be achieved by a variety of devices depending on the type of jack used. The jacks may include powered scissor jacks, pneumatic or hydraulic rams being driven through relays, solenoids, transistor switches etc.

For platforms operating with more than four legs, the basic levelling procedure described may be used on the four corners, with additional jacks being lowered until they reach the ground. This would involve the use of additional logic.

With the addition of three logic gates an alarm system may be incorporated to detect movement of a levelled platform.

It is possible to design a number of logic systems to control the levelling procedure and one such system is shown in FIG. 4.

The system in FIG. 4 comprises thirty-eight NOT gates 101 through 138, seventeen AND gates 201 through 217, and ten NOT gates 301 through 310.

TABLE 1

| Jacks Activated | L1 | L2 | L3 | T1 | T2 | T3 | S1 | S2 | S3 | S4 | Name of State |
|---|---|---|---|---|---|---|---|---|---|---|---|
| J1, J2, J3, J4 | L | L | H | L | L | H | H | H | H | H | (a) |
| J3, J4 | L | L | H | H | L | L | H | H | H | H | (b) |
| J1, J2 | L | L | H | L | H | L | H | H | H | H | (c) |
| J3, J2 | H | L | L | L | L | H | H | H | H | H | (d) |
| J4, J1 | L | H | L | L | L | H | H | H | H | H | (e) |
| J3 | H | L | L | H | L | L | H | H | H | H | (f) |
| J2 | H | L | L | L | H | L | H | H | H | H | (g) |
| J4 | L | H | L | H | L | L | H | H | H | H | (h) |
| J1 | L | H | L | L | H | L | H | H | H | H | (i) |

TABLE 1-continued

| Jacks Activated | L1 | L2 | L3 | T1 | T2 | T3 | S1 | S2 | S3 | S4 | Name of State |
|---|---|---|---|---|---|---|---|---|---|---|---|
| J3 | H | L | L | H | L | L | H | H | L | H | (j) |
| J2 | H | L | L | L | H | L | H | L | H | L | (k) |
| J4 | L | H | L | H | L | L | H | H | H | L | (l) |
| J1 | L | H | L | L | H | L | L | H | H | H | (m) |
| J4 | L | L | H | H | L | L | H | H | L | H | (n) |
| J1 | L | L | H | L | H | L | H | L | H | H | (o) |
| J3 | L | L | H | H | L | L | H | H | H | L | (p) |
| J2 | L | L | H | L | H | L | L | H | H | H | (q) |
| J4, J3 | L | L | H | H | L | L | H | H | L | L | (r) |
| J2, J1 | L | L | H | L | H | L | L | L | H | H | (s) |
| J4, J3 | L | L | H | L | L | H | L | L | H | H | (t) |
| J2, J1 | L | L | H | L | L | H | H | H | L | L | (u) |

I claim:

1. Apparatus for automatically levelling a base comprising:
   a first switch means for sensing mislignment in a first direction and for providing a first signal indicative of that misalignment;
   a second switch means for sensing misalignment in a second direction and for providing a second signal indicative of that misalignment;
   levelling means comprising a plurality of retractable and extendible height altering means for adjusting the disposition of the base with respect to a surface on which the base is to be levelled, each of which altering means is provided with a further switch which is activated in response to a contact between the levelling means and the surface to provide a further signal indicative of that contact; and
   control means responsive to said first, second, and further signals to control the levelling means and level the base (a), if the base is not level in both first and second directions, by controlling one only of the levelling means to level the base in one of the first and second directions and then, by controlling another one or two adjacent levelling means to level the base in the other of the first and second directions; or (b), if the base is level in one of the said first and second directions but not level in the other of the said first and second directions, by controlling one or two adjacent levelling means to level the base in the other of the first and second directions.

2. Apparatus according to claim 1, the base having four corners, wherein each height altering means comprises a jack disposed at a respective one of the corners, and wherein the first and second directions are mutually perpendicular, in the plane of the base.

3. Apparatus according to claim 1, wherein each further switch means is housed in a resilient casing which, on contact with the surface, causes the respective further switch means to be actuated.

4. Apparatus according to claim 1, wherein the control means comprises a circuit formed by interconnected logic gates.

* * * * *